US008079083B1

(12) United States Patent
Bennett et al.

(10) Patent No.: US 8,079,083 B1
(45) Date of Patent: Dec. 13, 2011

(54) METHOD AND SYSTEM FOR RECORDING NETWORK TRAFFIC AND PREDICTING POTENTIAL SECURITY EVENTS

(75) Inventors: Jeremy Bennett, Mountain View, CA (US); Carl Alexander Adams, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 1109 days.

(21) Appl. No.: 11/219,314

(22) Filed: Sep. 2, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................................................ 726/23

(58) Field of Classification Search .............. 726/23–25; 709/224
See application file for complete search history.

(56) References Cited

U.S. PATENT DOCUMENTS

| | | | | |
|---|---|---|---|---|
| 7,307,999 | B1 * | 12/2007 | Donaghey | 370/465 |
| 7,313,695 | B2 * | 12/2007 | Norton et al. | 713/166 |
| 2003/0105976 | A1 * | 6/2003 | Copeland, III | 713/201 |
| 2004/0034800 | A1 * | 2/2004 | Singhal et al. | 713/201 |
| 2004/0172557 | A1 * | 9/2004 | Nakae et al. | 713/201 |
| 2004/0193943 | A1 * | 9/2004 | Angelino et al. | 714/4 |
| 2004/0199790 | A1 * | 10/2004 | Lingafelt et al. | 713/201 |

OTHER PUBLICATIONS

Cavusoglu et al., A Model for Evaluating IT Security Investments, Jul. 2004, Communications of the ACM, vol. 47, No. 7.*
Samfat et al., IDAMN: an Intrusion Detection Architecture for Mobile Networks, Sep. 1997, IEEE Journal of Selected Areas in Communications, vol. 15, No. 7.*

* cited by examiner

*Primary Examiner* — Nasser Moazzami
*Assistant Examiner* — Trong Nguyen
(74) *Attorney, Agent, or Firm* — Wilmer Cutler Pickering Hale and Dorr LLP

(57) ABSTRACT

Recording network traffic is disclosed. Data associated with a network flow are monitored. If it is determined that the data associated with the network flow satisfy a first criterion based at least in part on a prediction value that reflects a likelihood that the network flow will result in a security event, the data associated with the network flow are begun to be recorded even though a second criterion corresponding to the security event has not been satisfied.

16 Claims, 7 Drawing Sheets

METHOD AND SYSTEM FOR RECORDING NETWORK TRAFFIC AND PREDICTING POTENTIAL SECURITY EVENTS

BACKGROUND OF THE INVENTION

Data associated with a network security event may be used to forensically analyze the security event and prevent the event from happening in the future. In the past, recording of network flow data to permit such forensic analysis typically has commenced once a security event has been detected, which results in network data sent or received prior to the event being detected not being captured. In some cases, recent data for all traffic associated with a protected network have been held in a buffer, with older data being overwritten by more recent data as the buffer becomes full. But given the size and speed of modern networks and limits in the storage capacity of such buffers and the processing capacity of associated processors, the data stored in such buffers typically provide only a limited ability to retroactively (i.e., after an event has been detected) capture data for a specific flow with respect to which a network security event has been detected. There is a need, therefore, for a more effective way to capture data associated with a network security event, and in particular data sent or received prior to it being determined that a network security event has been detected.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Recording network traffic is disclosed. Data associated with a network flow are monitored. If it is determined that the data associated with the network flow satisfy a first criterion based at least in part on a prediction value that reflects a likelihood that the network flow will result in a security event, the data associated with the network flow are begun to be recorded even though a second criterion corresponding to the security event has not been satisfied.

Figure 1:
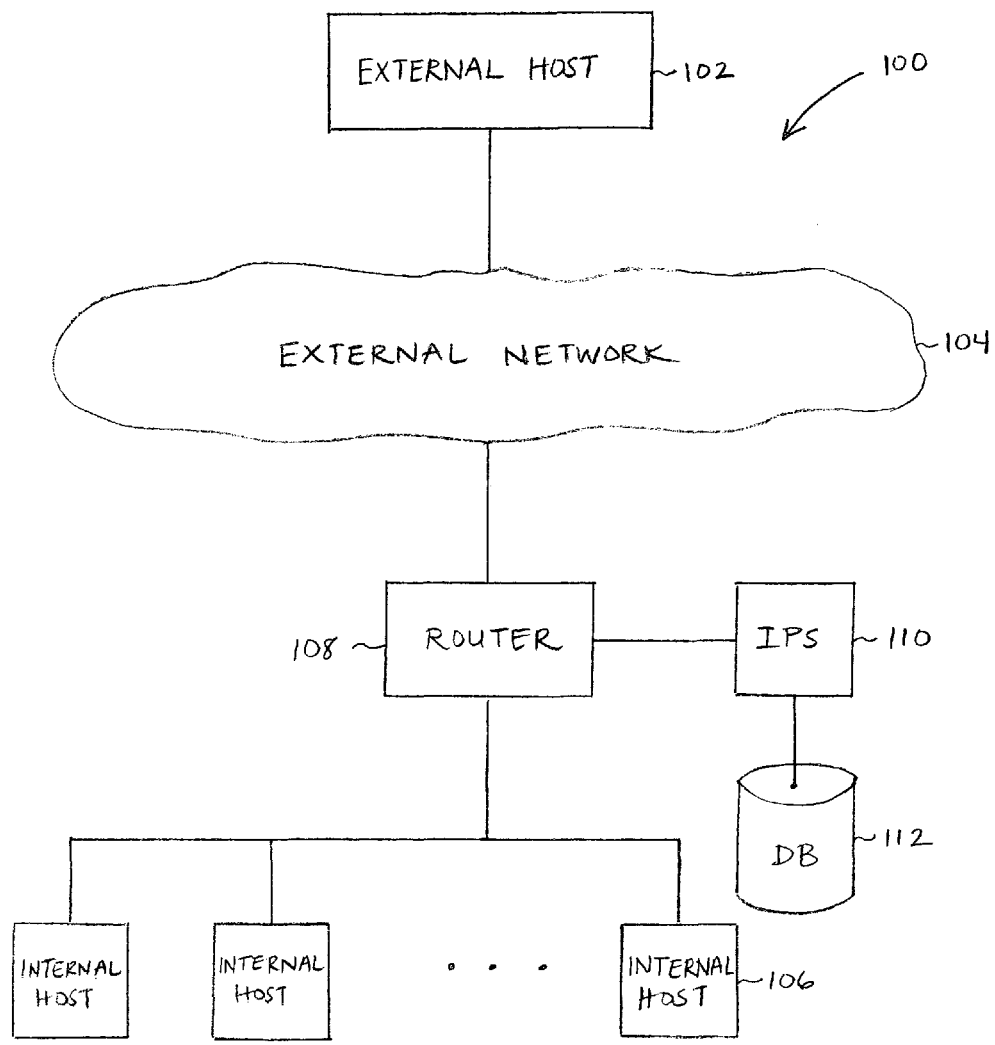
FIG. 1 illustrates an embodiment of a network environment in which an intrusion prevention system is configured to monitor and record network traffic.

FIG. 1 illustrates an embodiment of a network environment in which an intrusion prevention system (IPS) is configured to monitor and record network traffic. In the example shown, network environment 100 includes an external host 102 connected to an external network 104. A secured network including a plurality of internal hosts, such as internal host 106, is connected to external network 104 via a router 108. In the example shown, the boundary of the secured network is defined by router 108. In some embodiments, router 108 includes a firewall. Router 108 is coupled to an intrusion prevention system, IPS 110. In some embodiments, IPS 110 is configured to monitor and record network traffic. IPS 110 may be configured to detect and save network flow data associated with one or more network security events. Database 112 is used by IPS 110 to save network flow data. Alternatively, an intrusion detection system (IDS), a firewall, a specialized external device, etc., may be used instead of or in addition to IPS 110 in network environment 100 to record network traffic associated with security events.

It is often the case that the data needed to verify or debug a security event occur before the security event is even detected. In the context of traffic recording for forensic purposes, therefore, it is useful to record the situational data leading up to and following a particular security event. For example, a security event generated through protocol anomaly detection (PAD) is often based upon a protocol state model. The production of a given PAD alert is based not just on the current packet but on a chain of state transitions. From a forensic standpoint, one purpose of recording the network traffic associated with a security event is to analyze the data associated with the entire security event from beginning to end to determine the nature and characteristics of the security event. For example, it would be useful to determine how an attacker infiltrated the network by overcoming current network defenses, what stage of the security event triggered the detection of the security event, when the data associated with the security event became anomalous, etc.

Selectively recording network traffic based on the likelihood that a particular network traffic flow will be determined to be associated with a security event, sometimes referred to herein as predictive traffic recording, is disclosed. With predictive traffic recording, network traffic is started to be recorded before a determination is made, if ever, that a security event is occurring or has occurred with respect to the flow and prior to any responsive action being triggered. In some cases, all of the data associated with a security event can be captured with predictive traffic recording. Moreover, such a predictive technique for recording traffic does not require a prohibitive amount of processor and/or storage resources because data are not stored for network flows not likely to be determined to be associated with a network security event.

In some embodiments, each network communication or flow is monitored. At any point in a network flow, there exists a probability that the flow will result in a security event. Any number of heuristics may be employed to assign an event probability to each analyzed packet of a flow as described in more detail below. When this probability crosses a threshold, traffic recording commences with respect to that flow. In some cases, the threshold is in the form of a numerical probability (e.g., 30%) or a score. In some cases, the threshold is determined by the number of paths or patterns associated with one or more known security events that a flow must follow in order to begin recording. Each path or pattern may be assigned a probability. In various embodiments, the threshold is adjustable and may be dynamic. Different thresholds for different security events may be used. The threshold may be changed or updated based on security events generated by and/or actually observed with respect to particular network flows, source or destination nodes, and/or patterns or signatures. Traffic recording may be commenced before an alert indicating a security event is generated or other responsive action is taken. For example, an alert indicating a potential security event may be generated at a threshold of 50%, but the threshold to begin recording may be lower, such as 25%.

Traffic recording continues until a stop condition is reached. The stop condition may be any number of tests, such as the end of a transmission control protocol (TCP) session, file size threshold, timer, etc., and/or may be determined by an operator. If it is determined that the recorded data do not correspond to a security event, the data may be discarded. If a security event is triggered, the recorded data may be marked for longer-term storage, and additional data may be added until the session completes.

Figure 2:
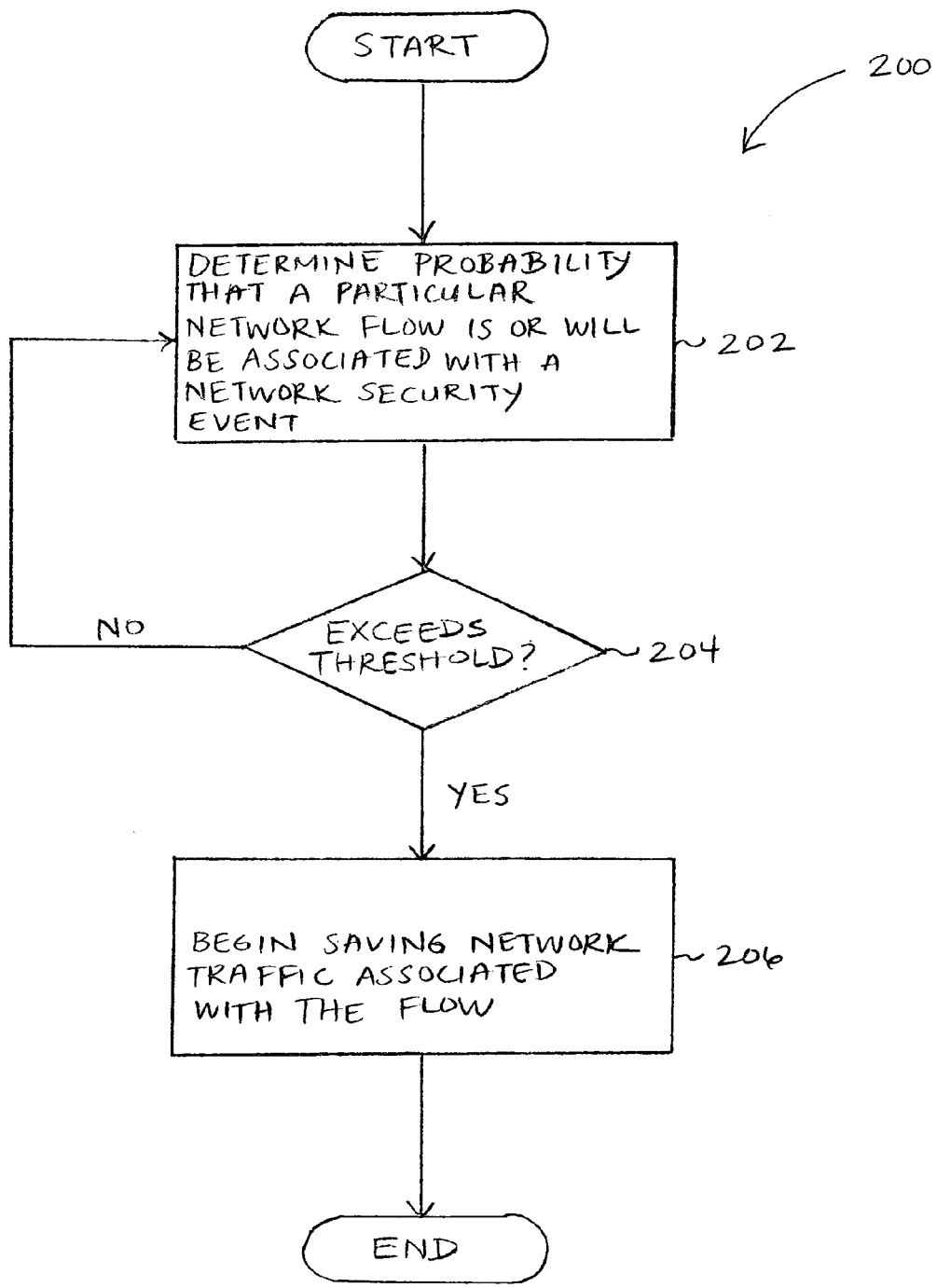
FIG. 2 illustrates an embodiment of a process for predictively recording network traffic.

FIG. 2 illustrates an embodiment of a process for predictively recording network traffic. In the example shown, process 200 begins at 202 in which the probability that a particular network flow is or will be associated with a network security event is determined. In some embodiments, the probability determined in 202 is associated with an identified security event. In some embodiments, a probability is determined in 202 for each of a plurality of security events. In some embodiments, a separate probability is determined for each potential security event for which the network flow is a potential match. In some embodiments, if a network flow is potentially associated with a plurality of security events and a plurality of probabilities are determined at 202, one for each security event, the highest probability is used in process 200. In some embodiments, the probability determined at 202 comprises a single, e.g., composite, value that represents the likelihood that the network flow is or will be associated with any one or more of a plurality of security events for which a signature and/or other characteristic data used to detect the event is known and/or monitored. At 204, it is determined whether the probability associated with the network flow at 202 exceeds a prescribed threshold. If it is determined at 204 that the probability associated with the network flow at 202 exceeds an applicable threshold, network traffic associated with the flow is begun to be saved at 206. In some embodiments, network traffic associated with the flow is saved at 206 for a predetermined period of time before process 200 ends. In some embodiments, network traffic associated with the flow is saved at 206 until an end condition is met and/or an operator command is received before process 200 ends. If it is determined at 204 that the probability associated with the network flow at 202 does not exceed a threshold, control returns to 202 in which further (e.g., subsequently received) network flow data are processed and an updated probability determined. In some embodiments, the probability determined at 202 is updated continuously, periodically, and/or as new data associated with the flow are received, until it is determined at 204 that the threshold has been exceeded and/or until the process of FIG. 2 ends. In some embodiments, process 200 is repeated to ensure that network traffic is continuously monitored. In some embodiments, the process 200 continues with respect to other potential security events even after recording is commenced at 206.

In some embodiments, a buffer of all network traffic is continuously maintained in storage, such as RAM, in a rotating basis. Such a buffer will overlap itself quickly as the buffer becomes full, and newly received data are written over the oldest data stored in the buffer. If at some point during a network flow it is determined that the probability that the network flow will resolve into a security event exceeds a threshold, such as at 204 of process 200, all or a relevant portion of the data stored in the buffer as well as subsequent network flow data are stored in a longer-term storage location, such as a disk. Such a buffer enables the capture of network data that precede subsequent data used to determine that a threshold condition to begin recording is satisfied. In some cases, some or all of the beginning portion of a session or flow is stored in the buffer and, thus, is not lost.

Figure 3:
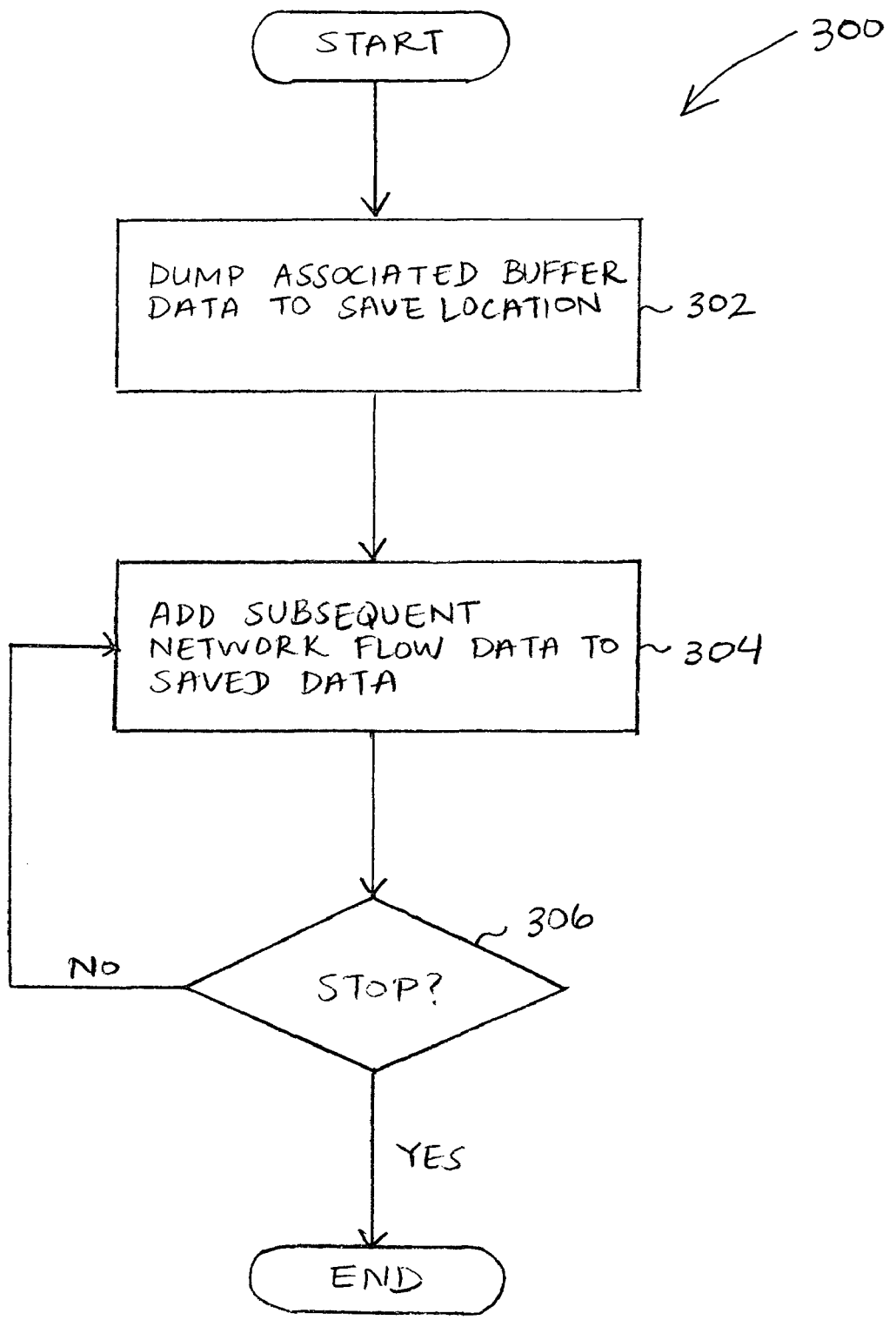
FIG. 3 illustrates an embodiment of a process for saving network flow data associated with a possible security event.

FIG. 3 illustrates an embodiment of a process for saving network flow data associated with a possible security event. In some embodiments, process 300 is used to implement 206 of process 200. At 302, buffer data associated with a possible security event are dumped into a save location. In some embodiments, all data in the buffer are dumped into the save location at 302. In some embodiments, only the portion of the buffer data, if any, that correspond to the current network session or flow are dumped into the save location at 302. At 304, subsequent network flow data are added to the saved data. It is determined at 306 whether a stop condition is met. If it is determined at 306 that a stop condition is met, process 300 ends. If it is determined at 306 that a stop condition is not met, process 300 continues with 304 at which the network flow data are continued to be added to the saved data.

Figure 4:
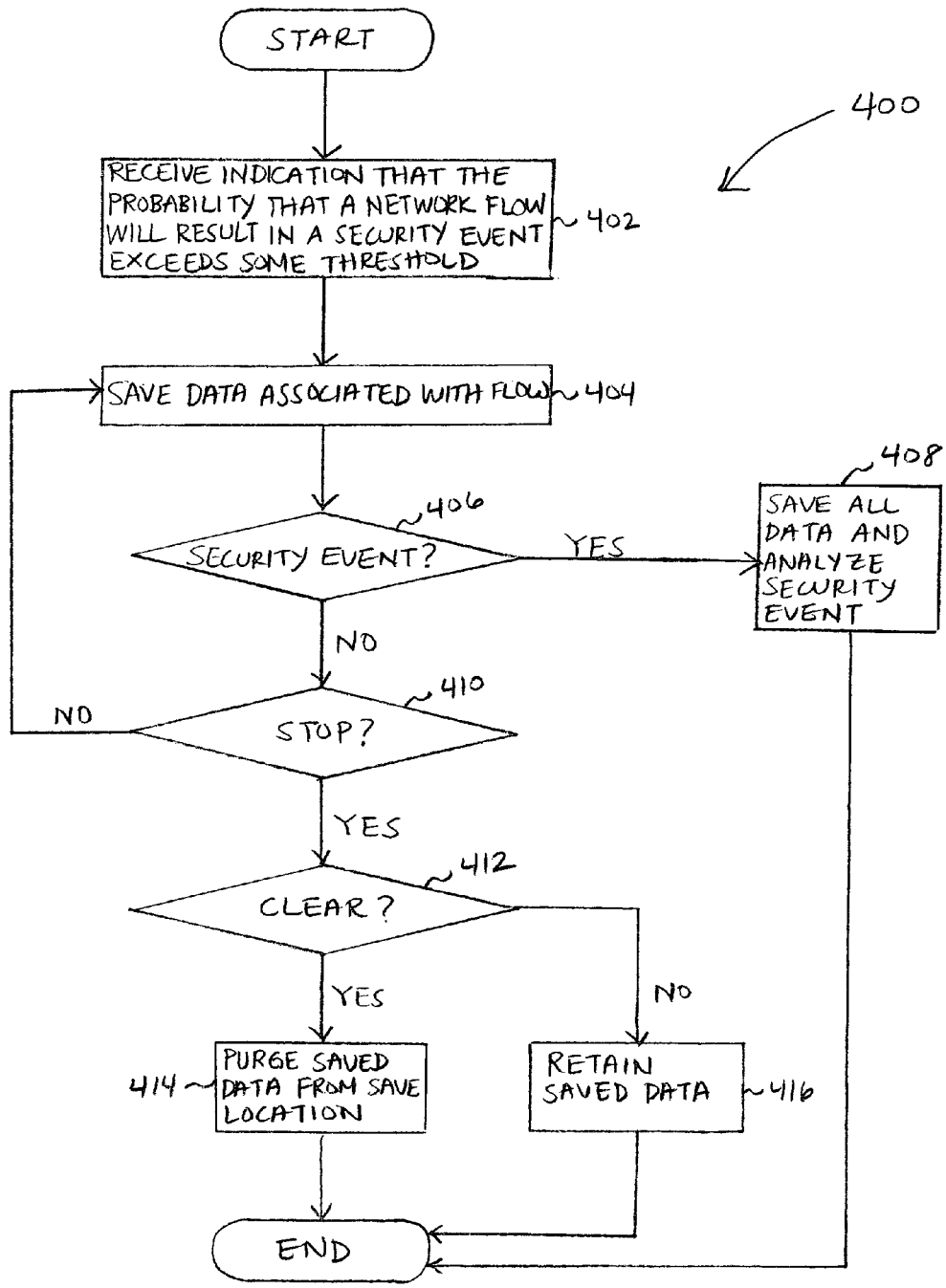
FIG. 4 illustrates an embodiment of a process used to record network traffic.

FIG. 4 illustrates an embodiment of a process used to record network traffic. Process 400 starts at 402 at which an indication is received that the probability that a network flow will result in a security event exceeds some threshold. At 404, data associated with the network flow are saved. In some embodiments, 404 includes saving buffer data associated with the network flow. At 406, it is determined whether a security event has occurred. If it is determined at 406 that a security event has occurred, all data associated with the security event are saved and analyzed at 408, and process 400 ends. In some embodiments, the security event is analyzed in real-time at 408. In some embodiments, the data that were captured at or around the time of the security event is analyzed later (i.e. not in real-time). Human analysis, automated analysis, or a combination thereof may be used to analyze the data associated with the security event at 408. In some embodiments, recording continues once a security event has been determined at 406 to have occurred. In various embodiments, recording continues for a prescribed period and/or until a prescribed event, such as termination of the flow or session or receipt of a command from a user. If it is determined at 406 that a security event has not occurred, it is determined at 410 whether to stop saving data. If it is determined at 410 not to stop saving data (i.e. a stop condition has not been met), process 400 continues with 404 and data are continued to be saved.

In some embodiments, it is determined at 410 that a stop condition has been met if the network flow has completed without triggering a security event at 406. If a stop condition is met at 410, it is determined at 412 whether the saved data are to be cleared. If it is determined at 412 that the saved data are to be cleared, the saved data are purged from the save location at 414, and process 400 ends. If it is determined at 412 that the saved data are not to be cleared, the saved data are retained at 416, and process 400 ends. In some embodiments, it is desirable to retain the saved data associated with a network flow that results in a normal termination condition (i.e. no security event alert was triggered by the flow) so that the data can be analyzed in the event that the network flow should have but failed to generate a security event alert at 406. In some embodiments, it is desirable to retain the saved data associated with a network flow that results in a normal termination condition to determine whether an attacker or hacker is attempting to decipher the manner in which security events are detected and is trying to gain current network defenses.

In some embodiments, multiple instances of process 400 are performed in parallel as network packets associated with different flows are received. In some embodiments, process 400 is serially performed. Thus, in some cases, simultaneous traffic recordings are possible while in other cases, where resources may be more limited, only one traffic recording may be recorded at a time. In the cases where only one network flow may be recorded at a time, traffic recording may be performed on a first to cross a threshold, first to be recorded basis. Alternatively, in the cases where only one network flow may be recorded, the network flow with the highest probability of resulting in a security event may be recorded first. In some cases, when the event probability associated with any network flow exceeds a threshold, all network traffic is recorded. In some cases, only selective traffic is recorded. For example, if a network flow associated with a particular email message triggers a recording, data associated with all network email may be recorded.

Figure 5:
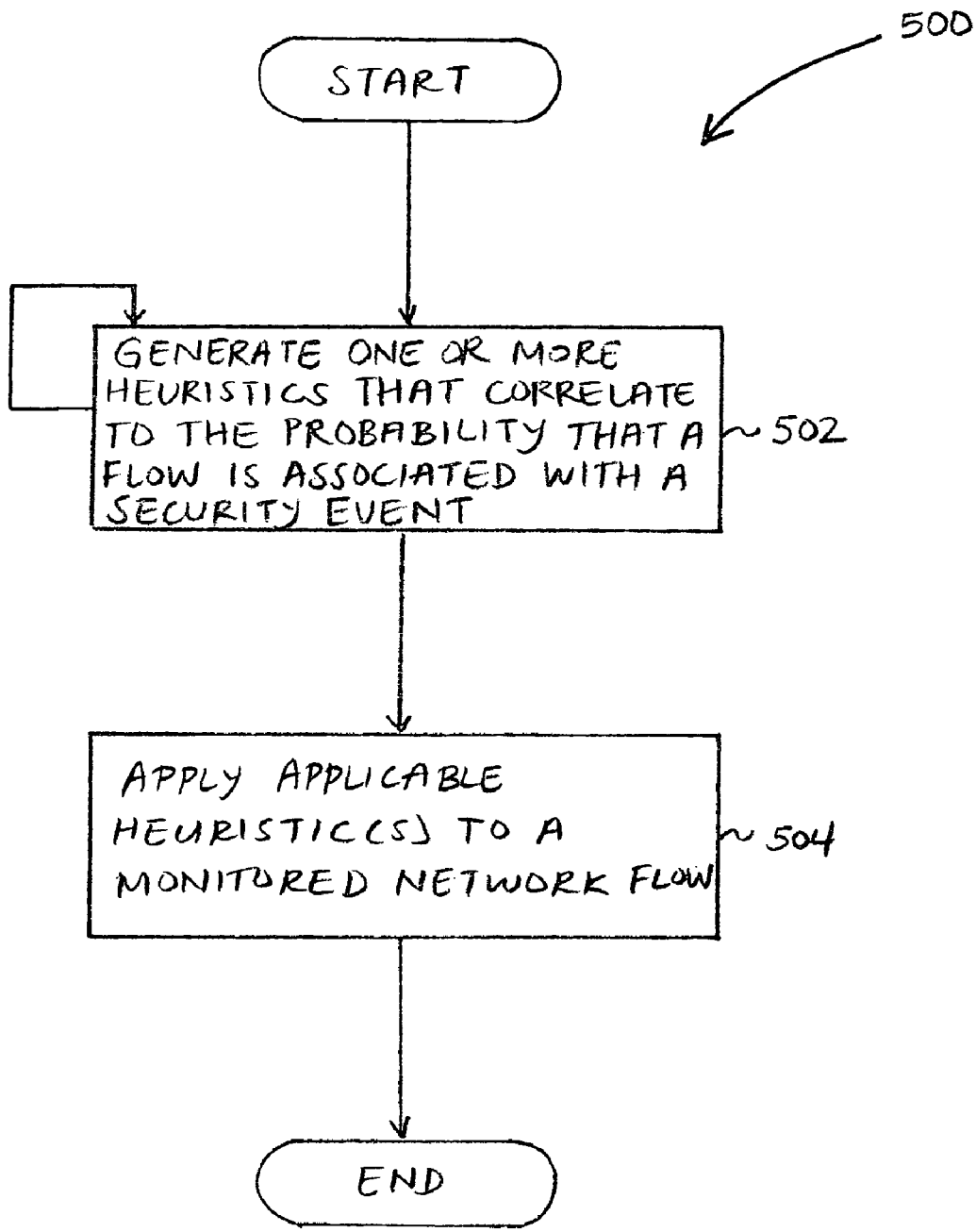
FIG. 5 illustrates an embodiment of a process for determining the probability that a particular network flow is or will be associated with a network security event.

FIG. 5 illustrates an embodiment of a process for determining the probability that a particular network flow is or will be associated with a network security event. In some embodiments, process 500 is employed at 202 of process 200 in FIG. 2. In the example shown, at 502 one or more heuristics that correlate to the probability that a flow is associated with a security event are generated. At any point in a network flow, there is a heuristically measurable probability that the flow will result in a security event. Given one or more packets associated with a flow, each heuristic produces a probability that future, related packets will produce a security event. Any one or more heuristics or predictive thresholding algorithms may be used. For example, as described more fully below, the heuristic(s) generated at 502 may be based on state-based predictions, pattern or signature-based predictions, behavior-based predictions, etc.

State-based predictions may be used for protocol validation since protocols usually follow and/or can be described using a state model. An IPS, such as IPS 110 of FIG. 1, may employ protocol anomaly techniques to detect security events. Most protocol anomaly systems use a state model to track the progress of protocol communications. The state model can be converted into a weighted graph using either static analysis or dynamic analysis. In either case, using any number of graph exploration algorithms known in the art, it is possible to look ahead a finite number of states and determine the probability that a network flow will progress from its' current state to a future state that produces a security event. Static analysis may be performed by a human and/or an automated system. Static analysis includes a one-time weighting of the graph links between states using fixed probabilities. The weighted graph is stored and used for future probability assessments. In some cases, dynamic analysis may be used. Dynamic analysis may start with the results of a static analysis but updates the probability weights of the graph links by tracking real traffic through state transitions. The weights may be updated using one or more learning algorithms known in the art.

Network security events often follow particular code paths. An IPS, such as IPS 110 of FIG. 1, may be configured to employ pattern matching techniques to determine the probability that a particular network flow is associated with a security event. For instance, signature matching may be employed to determine the probability that a particular network flow is associated with an exploit signature. Pattern or signature-based prediction methods may also be treated as state machines that can be converted into weighted graphs using static and/or dynamic analysis as described above. At any point during analysis, a data flow may be in a potential-match state, partial-match state, no-match state, or a match state. Although it is not necessary that a match state will produce a security event, the match state is the only state that can produce a security event. The no-match state will never produce a security event. For each of the potential-match state (i.e. patterns are being processed but none have yet matched) and the partial-match state (i.e. part of one or more patterns have been matched but not the full pattern(s)), one or more probabilities associated with one or more future security events can be calculated based upon the number of potential patterns and the expected input network flow.

Behavioral or statistics-based predictions utilize the past behavior of particular source (sending) systems (e.g., by IP address), networks, network flows, etc. The pattern and nature of the connections are analyzed and compared to similar data associated with past security events. For example, it may be useful to determine and compare which source and destination are communicating, how much data are being transferred between a source and destination, whether the volume of a particular type of traffic is excessive, etc. Thus, the input to behavior-based predictive algorithms includes the data associated with past security events. Hosts, surrounding networks, and known-related hosts may be marked as suspicious if they have generated past security events. The decisions associated with behavior-based predictions may be restricted to one or more kinds of events if the broadest categories would result in recording too often. For example, if a portscan is detected from a particular host, every host on that network may be considered suspicious, or at least relatively more suspicious than hosts not associated with that network. A refinement of this approach may be that if a host on a known botnet (i.e., a group of hosts known to have been compromised and/or used maliciously in concert, whether or not on the same network) issues a portscan, every host on that botnet is watched for activity to the ports reported as open in the portscan. Thus, if a host has previously produced a security event for a particular destination, future connections to the destination from that host may be assigned high probabilities for producing future security events. In some cases, if a network flow is associated with statistically anomalous behavior (e.g., creating excessive network traffic, etc.), a high event probability may be assigned, which may result in the recording of the network flow.

Returning to process 500 of FIG. 5, the heuristic(s) generated at 502 may be continually updated as data or packets associated with network flows are processed. In some embodiments, one or more learning algorithms may be used to update the heuristic(s). One or more of the heuristics generated at 502 are applied to a monitored network flow at 504. The one or more heuristics generated at 502 may be used individually or together at 504 to derive one or more security event probabilities and/or scores. The probabilities and/or scores determined for a network flow may be updated as the heuristic(s) are updated. In some embodiments, at 504 all available heuristics that are relevant to a particular monitored flow are applied to that flow. For example, in the case of HTTP traffic over a TCP/IP connection between an internal host and an external host, e.g., via the Internet, those heuristics applicable to the particular protocols being used and traffic being sent via the connection are applied.

Figure 6A:
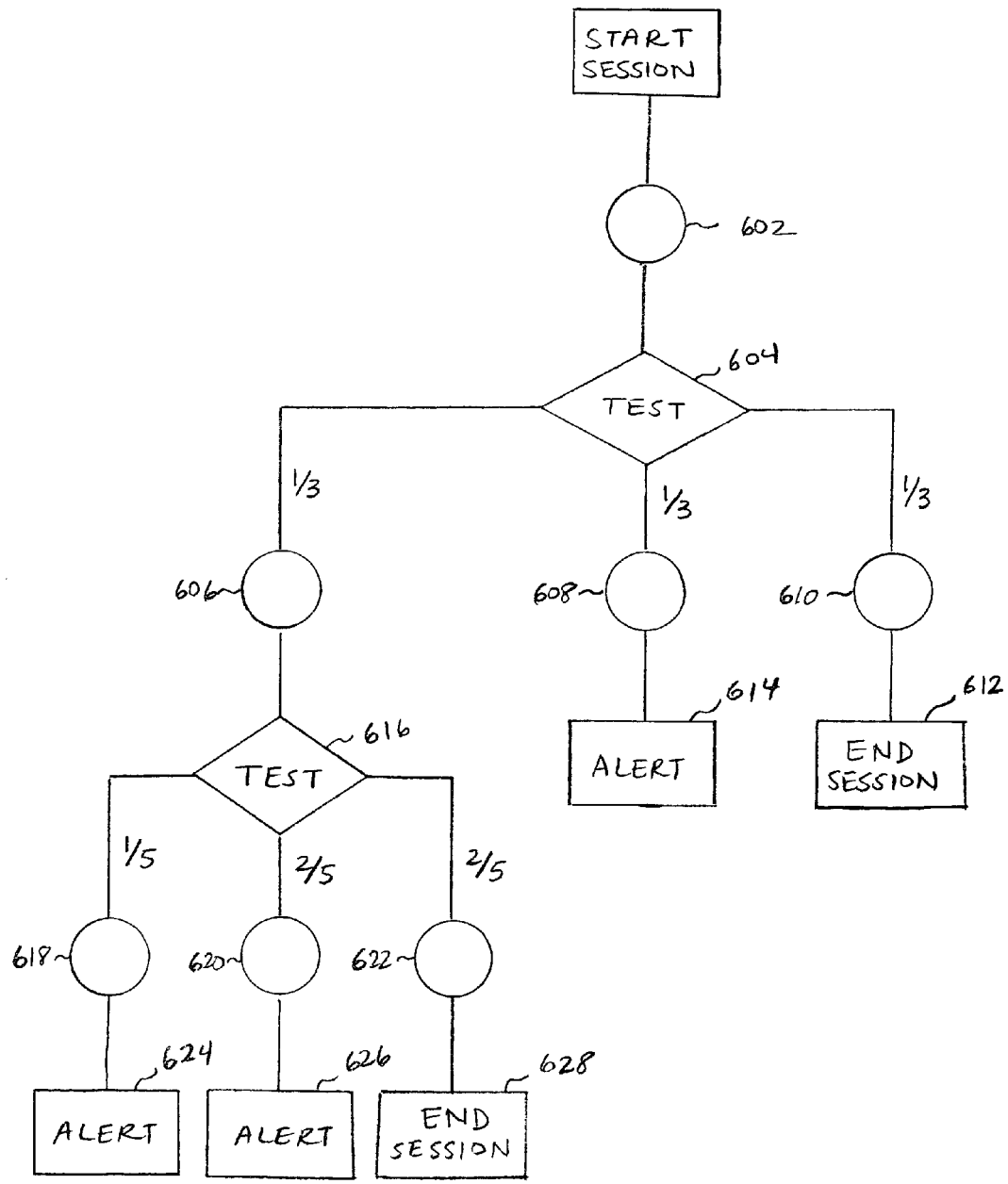
FIG. 6A illustrates an example of a state graph in which probabilities are assigned to the graph links between states using static analysis.

FIG. 6A illustrates an example of a state graph in which probabilities are assigned to the graph links between states using static analysis. In the example shown, states are represented by circles. State 602 is the starting state. Based on the results of a test or condition at 604, it is determined whether state 602 will transition to state 606, 608, or 610. In some embodiments, test 604 includes receiving network data, e.g., one or more network packets, associated with a transition out of start state 602 and determining based at least in part on the data which of states 606, 608, and 610 the connection has transitioned (or will or would transition) into as a result of the data being sent. As depicted in the state diagram, there is a ⅓ probability that state 602 will advance to state 606, a ⅓ probability that state 602 will advance to state 608, and a ⅓ probability that state 602 will advance to state 610. These probabilities are determined in some embodiments by having a person, process, and/or system having knowledge of the protocol and its valid and malicious uses assign the probabilities. In some embodiments, the probabilities may be assigned statically or dynamically based on observed and/or expected use of the protocol with respect to the protected network and/or particular hosts. In the example shown, it has been determined that a connection that is in the initial or start state 602 is equally likely to transition into each of states 606, 608, and 610. A valid end condition 612 is reached from state 610 because, for example, in the simplified example shown, arriving at state 610 indicates that a session has completed successfully without triggering a security event. A valid end condition is not reached from state 608, and an alert 614 is generated to indicate a security event. For example, state 608 may be a state entered into as a result of a known exploit or vulnerability of the protocol described by the graph of FIG. 6A. If a connection enters into state 606, a valid intermediate state in this example, another test 616 is conducted to determine whether state 606 will transition to state 618, 620, or 622. As depicted in the state diagram, there is a ⅕ probability that state 606 will transition to state 618, a ⅖ probability that state 606 will transition to state 620, and a ⅖ probability that state 606 will transition to state 622. A valid end condition is not reached from state 618, and an alert 624 is generated to indicate a security event. Similarly, a valid end condition is not reached from state 620, and an alert 626 is generated to indicate a security event. A valid end condition 628 is reached from state 622.

The probabilities associated with the graph links between the various states of a state graph may be combined to derive the probability that a particular type of event will result from any given state. For example, in FIG. 6A, there exists a 1/15(⅓*⅕), 2/15 (⅓*⅖), and ⅓ probability that state 602 will result in alert 624, alert 626, and alert 614, respectively. Therefore, there is an 8/15 (1/15+2/15+⅓) or 53.3% probability that a connection currently in start state 602 will result in an alert (i.e. a security event). If it can be determined near the beginning of a session that there is a fairly good chance of a security event in the future, it is possible to capture data from or near the start of the session and before a security event is actually detected. Thus, in the given example, if the probability that starting state 602 will result in a security event (i.e. 53.3%) exceeds a prescribed threshold (e.g., 30%), it may be desirable to record the session associated with state 602 from the beginning. If the threshold were 55%, recording would not begin at state 602, but would begin, for example, if the connection entered state 606, from which there is a ⅗ (60%) probability of a state associated with a security event (i.e., state 618 or state 620) being reached.

Although fixed probabilities are depicted in the state model of FIG. 6A, e.g., from using static analysis, dynamic analysis may be used to determine the probabilities associated with the graph links between each state. These probabilities may be dynamically updated as a network flow progresses. The probabilities assigned to the graph links between the states may be based on knowledge of the corresponding protocol and/or code, the nature and characteristics of known attacks, etc.

Figure 6B:
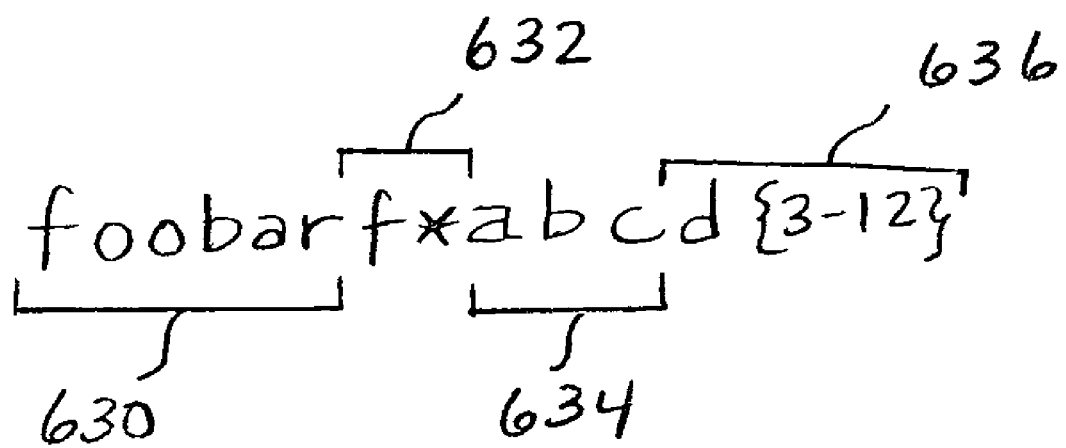
FIG. 6B illustrates an example of an exploit signature.

As discussed above, pattern or signature-based prediction methods may be used to assign one or more probabilities to various stages of a network flow wherein the probabilities are associated with the likelihood that the network flow will result in a security event. The probabilities may correspond to partial matches of a network flow with a known exploit pattern. Signature matching can be used to identify the probabilities that successive stages of a network flow will result in a known exploit signature. FIG. 6B illustrates an example of an exploit signature. As illustrated in FIG. 6B, the exploit signature "foobarf*abcd{3-12}" is divided into four consecutive pattern spaces. Specifically, 630 corresponds to "foobar", 632 corresponds to "f*", 634 corresponds to "abc", and 636 corresponds to "d{3-12}". In the example shown, the asterisk (*) is a wild card that is matched by any one or more characters and the portion d{3-12} is matched by any string of 3 to 12 characters "d". Successively increasing probabilities may be assigned to each consecutive part of the exploit signature. For example, parts 630, 632, 634, and 636 may be assigned probabilities of 15%, 35%, 60%, and 100%, respectively. The probabilities assigned to each part correspond to the probability that an input network flow will result in the exploit signature if the input network flow successively matches the parts of the exploit signature. For example, consider the input network flow "foobarfffabcqed". Given the aforementioned probabilities associated with the various parts of the exploit signature, the probability that the input network flow will result in the exploit signature "foobarf*abcd{3-12}" is 15% after the first six characters ("foobar") of the input network flow have been received and processed, because these six characters match the corresponding characters in the first portion 630. After the next three characters ("fff") of the network flow are received and compared with corresponding characters in the exploit signature, there exists a 35% probability that the network flow will result in the exploit signature, because the string "fff" matches the signature portion 632 ("f*"). Similarly, after the next three characters ("abc") of the network flow are matched with corresponding characters in the exploit signature, there exists a 60% probability that the network flow will result in the exploit signature. However, in this example, the network flow does not result in the exploit signature since the last three characters ("qed") of the network flow do not match corresponding characters in the exploit signature.

If the probability that a network flow will result in a security event crosses a threshold, the network flow may be started to be saved. For example, if the threshold to begin saving in the above example were 30%, then recording of data associated with the network flow would begin once the characters "fff" had been received and processed, because as of that point there was a 35% probability the flow would match the signature. In some embodiments, data prior to and/or including the portion that triggered recording, in the above example the portion "foobarfff", may be captured, e.g., by dumping a wrap around buffer into a save location, in addition to beginning to record the current and subsequent data associated with the flow in a save location, facilitating more complete analysis than would be possible if recording did not begin until a flow was determined to fully match the signature. In some embodiments, data associated with a failed match are saved, if recording was triggered, even if the flow is determined not to match the signature, e.g., to allow for data that nearly match a signature to be analyzed to determine if the data are associated with a variant on a known exploit with which the signature is associated. Such analysis would permit the signature to be updated, or an additional signature to be defined, to anticipate and detect future instances of the variant. In some cases, a threshold may be based upon the number of characters and/or operators that need to be matched before beginning to record, as opposed to assigned numerical probabilities as described above.

Probabilities may be assigned to a pattern in various manners and with various levels of refinement. For example, in the exploit signature of FIG. 6B, probabilities could have been assigned to each character, rather than to groups of characters. The probabilities may be based at least in part on the knowledge of the input character space and of the pattern(s) that are likely to result in matches. The probabilities may be statically and/or dynamically determined. Knowledge of the manner in which signatures are written by signature authors may be used to determine the probabilities. Signatures are often written so as to minimize partial matches (e.g., the distinguishing portions of a signature are often presented near the beginning of the signature). Thus, for example, if a prefix matching algorithm between an exploit pattern or signature and a network flow results in a match, a high event probability may be assigned to the network flow.

As described herein, by using any number or combination of heuristics, it is possible to predictively record a network flow. Network traffic associated with a potential security event can be started to be recorded long before some criterion is satisfied that causes an alert to be generated indicating that a security event is or potentially is in progress. Thus, it is possible to retain data associated with an entire security event, from beginning to end.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing network traffic, comprising:
using at least one processor to monitor network traffic;
determining if the network traffic satisfies a first criterion, wherein determining if the network traffic satisfies a first criterion includes:
identifying a plurality of probabilities by applying the network traffic to a state graph that comprises a plurality of states, wherein each of the plurality of probabilities indicates a likelihood that the network traffic is associated with a security event and each of the plurality of probabilities is associated with a corresponding one of the plurality of states;
combining the plurality of probabilities to generate a combined probability that indicates the likelihood that the network traffic is associated with the security event, wherein combining the plurality of probabilities comprises summing the plurality of probabilities; and
determining whether the combined probability exceeds a predetermined threshold;
storing the network traffic in a first storage location until it is determined that the first criterion has been satisfied; and
storing, in a second storage location, the network traffic stored in the first storage location and at least subsequent network traffic based on a determination that the first criterion has been satisfied and even though a second criterion corresponding to the security event has not been satisfied and the security event has not yet occurred, wherein the network traffic with a highest combined probability of resulting in the security event in the first storage location is stored first in the second storage location.

2. The method as recited in claim 1, wherein the security event is one of a plurality of security events in which the network traffic may result, a prediction value is determined for each of said plurality of security events, and a highest prediction value from among the prediction values determined for said plurality of security events is used to determine if the network traffic satisfies the first criterion.

3. The method as recited in claim 1, wherein the security event is one of a plurality of security events in which the network traffic may result, a prediction value is determined for each of said plurality of security events, and a composite of the prediction values determined for said plurality of security events is used to determine if the network traffic satisfies the first criterion.

4. The method as recited in claim 1, further comprising generating at least one heuristic that is based at least in part on one or more of state-based predictions, pattern-based predictions, and behavior-based predictions.

5. The method as recited in claim 4, wherein the at least one heuristic is dynamically updated and reapplied.

6. The method as recited in claim 1, wherein the security event comprises one of a set of one or more security events and the first criterion is based at least in part on a number of said one or more security events that the network traffic could result in.

7. The method as recited in claim 1, wherein the first criterion is dynamic.

8. The method as recited in claim 1, wherein the network traffic is stored in the second storage location until a stop condition is satisfied.

9. The method as recited in claim 1, further comprising:
determining that the network traffic satisfies the second criterion; and
analyzing the network traffic stored in the second storage location.

10. The method as recited in claim 1, wherein the first storage location comprises a rolling buffer.

11. A system for storing network traffic, comprising:
a processor configured to:
monitor network traffic;
determine if the network traffic satisfies a first criterion, wherein the processor is configured to determine if the network traffic satisfies a first criterion by:
identifying a plurality of probabilities by applying the network traffic to a state graph that comprises a plurality of states, wherein each of the plurality of probabilities indicates a likelihood that the network traffic is associated with a security event and each of the plurality of probabilities is associated with a corresponding one of the plurality of states;

combining the plurality of probabilities to generate a combined probability that indicates the likelihood that the network traffic is associated with the security event, wherein combining the plurality of probabilities comprises summing the plurality of probabilities; and determining whether the combined probability exceeds a predetermined threshold;

store the network traffic in a first storage location until it is determined that the first criterion has been satisfied; and store, in a second storage location, the network traffic stored in the first storage location and at least subsequent network traffic based on a determination that the first criterion has been satisfied and even though a second criterion corresponding to the security event has not been satisfied and the security event has not yet occurred, wherein the network traffic with a highest combined probability of resulting in the security event in the first storage location is stored first in the second storage location; and a memory coupled with the processor, wherein the memory provides the processor with instructions.

12. The system as recited in claim 11, wherein the first storage location comprises a rolling buffer.

13. A computer program product for storing network traffic, the computer program product comprising a non-transitory computer readable storage medium having computer instructions encoded thereon which when executed by a computer cause the computer to perform the steps of:

monitoring network traffic;

determining if the network traffic satisfies a first criterion, wherein determining if the network traffic satisfies a first criterion includes:

identifying a plurality of probabilities by applying the network traffic to a state graph that comprises a plurality of states, wherein each of the plurality of probabilities indicates a likelihood that the network traffic is associated with a security event and each of the plurality of probabilities is associated with a corresponding one of the plurality of states;

combining the plurality of probabilities to generate a combined probability that indicates the likelihood that the network traffic is associated with the security event, wherein combining the plurality of probabilities comprises summing the plurality of probabilities; and determining whether the combined probability exceeds a predetermined threshold;

storing the network traffic in a first storage location until it is determined that the first criterion has been satisfied; and storing, in a second storage location, the network traffic stored in the first storage location and at least subsequent network traffic based on a determination that the first criterion has been satisfied and even though a second criterion corresponding to the security event has not been satisfied and the security event has not yet occurred, wherein the network traffic with a highest combined probability of resulting in the security event in the first storage location is stored first in the second storage location.

14. The computer program product as recited in claim 13, wherein the first storage location comprises a rolling buffer.

15. A system for storing network traffic, comprising:

a monitoring computing apparatus configured to monitor network traffic;

a determination computing apparatus configured to determine if the network traffic satisfies a first criterion, wherein determining if the network traffic satisfies a first criterion includes:

identifying a plurality of probabilities by applying the network traffic to a state graph that comprises a plurality of states, wherein each of the plurality of probabilities indicates a likelihood that the network traffic is associated with a security event and each of the plurality of probabilities is associated with a corresponding one of the plurality of states;

combining the plurality of probabilities to generate a combined probability that indicates the likelihood that the network traffic is associated with the security event, wherein combining the plurality of probabilities comprises summing the plurality of probabilities; and determining whether the combined probability exceeds a predetermined threshold;

a storing computing apparatus configured to store the network traffic in a first storage location until it is determined that the first criterion has been satisfied; and a storing computing apparatus configured to store, in a second storage location, the network traffic stored in the first storage location and at least subsequent network traffic based on a determination that the first criterion has been satisfied and even though a second criterion corresponding to a security event has not been satisfied and the security event has not yet occurred, wherein the network traffic with a highest combined probability of resulting in the security event in the first storage location is stored first in the second storage location.

16. The system as recited in claim 15, wherein the first storage location comprises a rolling buffer.

* * * * *